E. J. MALLETT, Jr.
Disinfecting Apparatus for Water-Closets, &c.
No. 9,068. Reissued Feb. 10, 1880.
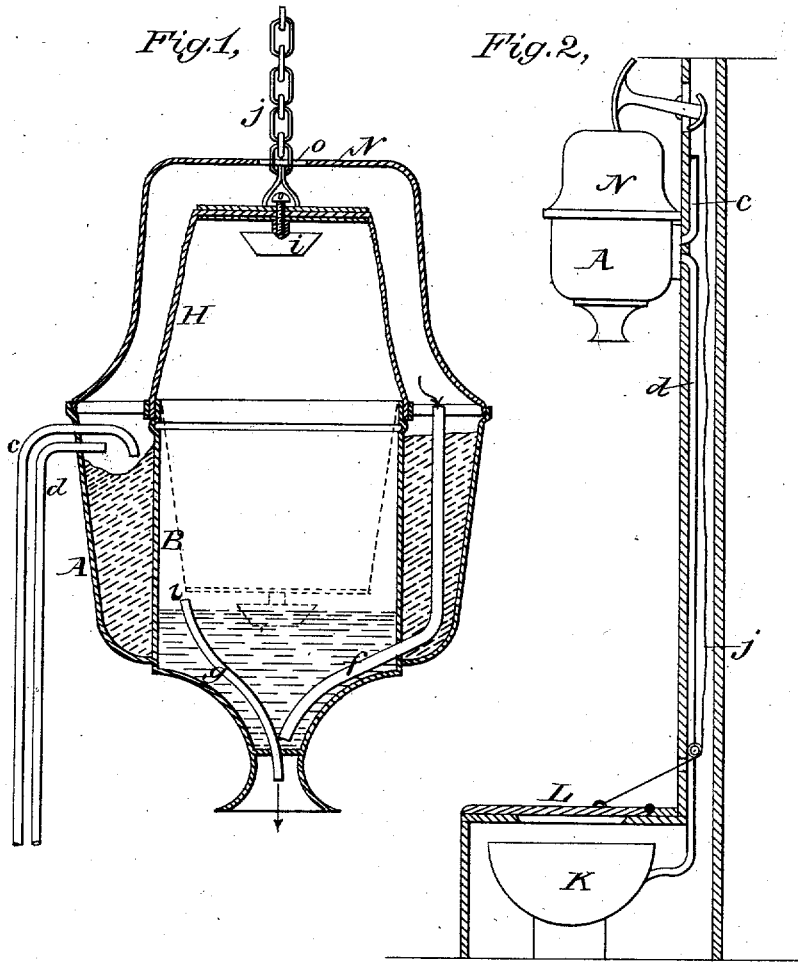
WITNESSES
George W.
E. C. Fock
INVENTOR
Edward J. Mallett Jr.
by M. Bailey
his ATTORNEY
N. PETERS, PHOTO-LITHOGRAPHER, WASHINGTON, D. C.

UNITED STATES PATENT OFFICE.

EDWARD J. MALLETT, JR., OF NEW YORK, N. Y.

DISINFECTING APPARATUS FOR WATER-CLOSETS, &c.

SPECIFICATION forming part of Reissued Letters Patent No. 9,068, dated February 10, 1880.

Original No. 222,519, dated December 9, 1879. Application for Reissue filed January 10, 1880.

*To all whom it may concern:*

Be it known that I, EDWARD J. MALLETT, Jr., of the city, county, and State of New York, have invented a new and useful Improvement in Disinfecting Apparatus for Water-Closets, &c., of which the following is a specification.

My invention relates to means for disinfecting water-closets and other places.

It has for its object to supply the closet, urinal, or the like with a liquid disinfectant in such a way as to prevent the local generation of noxious gases, and to neutralize or stamp out gas that may attempt to enter from the sewer, and also to disinfect, at the time the closet or the like is used, the room in which the same may be situated.

In order to attain the result first named, I combine with the closet a supply duct or pipe connected on the one hand with the bowl, soil-pipe, or other appropriate part of the closet, and on the other hand with a reservoir which contains disinfecting material and is in communication with a source of liquid-supply, in such manner that at all times, no matter how the closet in other respects may be constructed and adapted for operation, a continuous flow of disinfecting-liquid shall be maintained through the bowl or other appropriate part of the closet.

In order to disinfect the room, I make use of what I term an "aerial disinfector," which discharges into the room, at the times and in the manner substantially as hereinafter described, air charged with suitable disinfecting matter.

The nature of my invention and the manner in which the same is or may be carried into effect will be understood by reference to the accompanying drawings, in which—

Figure 1 is a vertical central section of an apparatus adapted to the purposes of my invention. Fig. 2 is a sectional view, representing the manner in which the same may be applied to a water-closet.

The letters A B designate two vessels, one appertaining to what I call the "liquid disinfector" and the other to the aerial disinfector. Through the side of the vessel A extend two pipes, *c d*, one above the other, and in applying my apparatus to a closet the upper pipe, *c*, is connected with a water-service pipe, or with a tank, as the case may be, and otherwise so arranged that water constantly drips into the vessel A through this pipe, or, in other words, so that a continuous supply of water is maintained. The other or lower pipe, *d*, at the same time is connected to the bowl K of the closet, or to the water-supply pipe or the soil-pipe, so as to discharge into the bowl or either of said pipes. The vessel A is then filled with disinfecting material—such as chloride of zinc—and as the water drips into the vessel from the supply-pipe *c* it is charged with or becomes a solution of such material. When the liquid disinfectant thus formed reaches the level of the pipe *d* it overflows by means of this pipe, and is thereby conducted to the closet bowl or pipe. In this manner the closet is constantly flushed with a disinfectant which prevents the local manufacture of gases and stamps out any gases that may attempt, from time to time, to enter from the sewer.

Into the vessel B project two pipes, *f g*, one forming an air-inlet and the other an air-outlet. Said vessel B is supplied with a disinfectant, such as a solution of thymol, and the arrangement of its two pipes is such that the air-inlet *f* terminates below the level of the solution, while the mouth *l* of the air-outlet *g* is above such level.

To the vessel B is connected an air suction and forcing device, consisting, in this example, of a flexible cap, H, which is attached to the top of the vessel and carries a weight, *i*, and of a chain, *j*, or the like, for lifting the cap up against the action of its weight. When the cap H is lifted up a vacuum is formed in the vessel B, which is at once filled with air admitted by the inlet *f*; and since this incoming air is caused to pass or bubble up through the thymol or other solution, it becomes charged with its vapor. If the cap H is now released, the same sinks down with the weight *i*, and by this means the air charged or impregnated with the vapor of thymol or other material is expelled from the vessel B, by the outlet *g*, into the closet-room, the effect of which is to maintain therein an atmosphere inimical to the propagation of disease-germs and free from unpleasant odors.

The direction of the pipe *f*, forming the air-inlet, is downward and inward, and since it terminates below the level of the solution in the vessel B, it always contains a column of liquid, which acts as a valve in preventing the escape of the air through the inlet while it is being forced out by the outlet *g*. In order to prevent the influx of air through the pipe forming the outlet *g*, this pipe is made of smaller diameter than the inlet-pipe *f*; but this can also be accomplished by providing the outlet with a self-acting valve. The air inlet and outlet *f g*, moreover, may be formed by valve-covered openings in the top of the cap H, and in that case a sponge or other absorbent may be attached to the cap in such a manner as to dip into the solution in the vessel B and give it off as a vapor, thereby charging the incoming air.

The two vessels A B are connected together, the same being in this example arranged one within the other, so that they occupy the least possible space, and they are surmounted by a cover, N, which is suitably shaped to allow the motion of the cap H, and which has a slot, *o*, for the passage of the chains *j*, or a lever for operating the chain.

When my invention is applied to a closet having a hinged seat-cover, as at L, Fig. 2, the chain *j* is connected to this cover in such a manner that when the seat-cover is lowered, as after using the closet, the cap H is lifted to its upper position, and vice versa. The result of this arrangement is, that the operation of the cap H is automatic, and the vapor is expelled from the vessel B during the use of the closet. The chain *j*, however, may also be connected with the door of the closet or arranged to be operated in any other way.

It is obvious that my invention is applicable to urinals, sinks, and other similar places, as well as to water-closets, and when it is applied to a urinal the cap H may be operated by a hinged platform arranged to receive the weight of the person using the urinal.

In conclusion, I would observe that I am aware that disinfecting material has been placed in the bowl of a closet or urinal for the flushing-water to pass over. I am also aware that the stated supply of the flushing-water ordinarily admitted to a closet after the latter has been used, in order to flush the bowl and wash out its contents, has been caused to mix with disinfecting-liquid or pass around and in contact with disinfecting material before discharging into the bowl. I claim none of these things.

What I claim as new, and desire to secure by Letters Patent, is—

1. The combination, with a water-closet or the like, of a vessel for containing disinfecting material, a water-pipe which communicates with and supplies water continuously to said vessel, and a discharge-pipe through which the water impregnated or charged with disinfecting material is led from the said vessel and discharged without intermission to the bowl or other appropriate part of the closet, so as to maintain through the closet at all times a continuous flow of disinfecting-liquid.

2. The combination, with a water-closet or the like, of an aerial disinfector consisting of a vessel for holding the disinfecting material, an air-inlet, and an air-outlet to such vessel, the latter communicating with the closet room or apartment, and an air-suction and forcing device attached thereto, all adapted for use substantially as described.

3. The combination, with a water-closet or the like, of a liquid disinfector connecting with and furnishing a continuous supply of disinfecting-liquid to the bowl or other appropriate part of the closet, and an intermittently-operating aerial disinfector communicating with the closet-room, substantially as and for the purposes described.

4. The combination, with the vessels A B, of a water-supply pipe, *c*, and a discharge-pipe, *d*, an air-inlet, *f*, an air-outlet, *g*, and an air suction and forcing device connecting with the vessel B, all adapted for use substantially as described.

In testimony whereof I have hereunto set my hand this 9th day of January, 1880.

E. J. MALLETT, Jr.

Witnesses:

Casper L. Cohn,

E. A. Dick.